June 30, 1936.　　　F. C. FANTZ　　　2,046,156
RETURN BEND FOR OIL STILLS
Filed Feb. 24, 1933　　　7 Sheets-Sheet 1

INVENTOR
Fred C. Fantz
BY Harry Lea Dodson
ATTORNEY

June 30, 1936. F. C. FANTZ 2,046,156
RETURN BEND FOR OIL STILLS
Filed Feb. 24, 1933 7 Sheets-Sheet 2
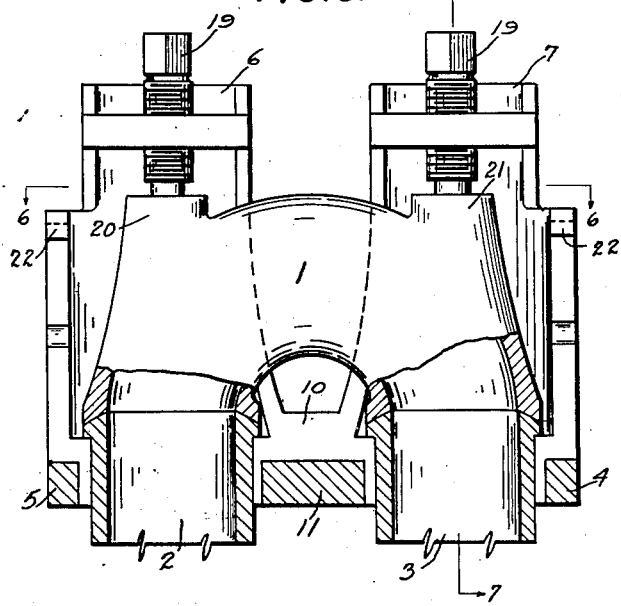
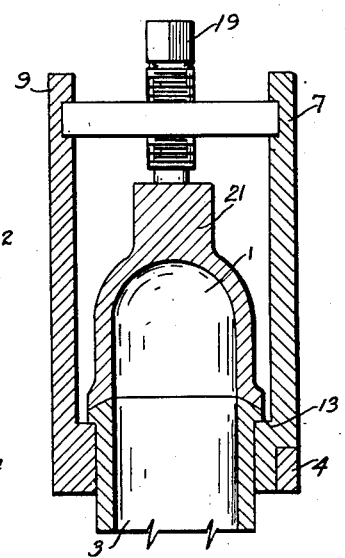
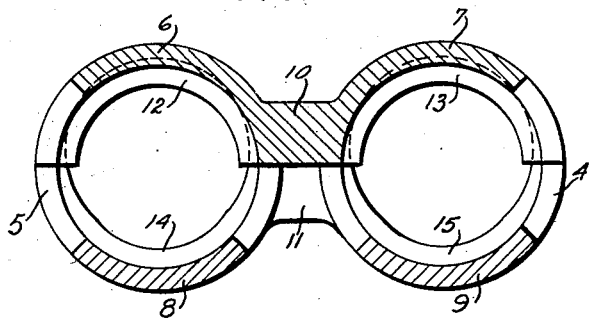
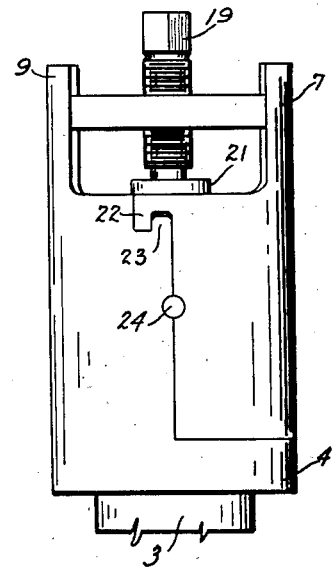
INVENTOR
Fred C. Fantz
BY Harvey Lea Dodson
ATTORNEY June 30, 1936.  F. C. FANTZ  2,046,156
RETURN BEND FOR OIL STILLS
Filed Feb. 24, 1933  7 Sheets-Sheet 3
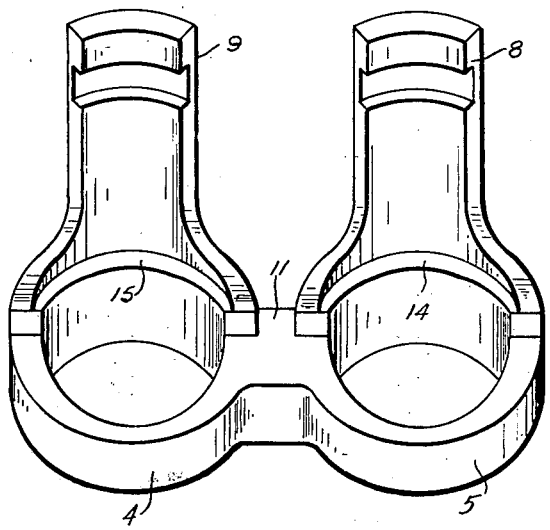
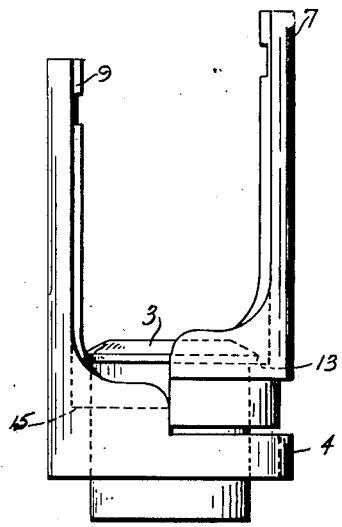
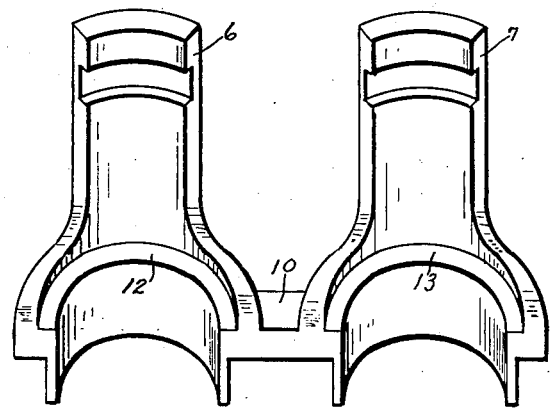
INVENTOR
Fred C. Fantz
BY
Harry Lea Dodson
ATTORNEY FIG. 12.
FIG. 14.
FIG. 13.
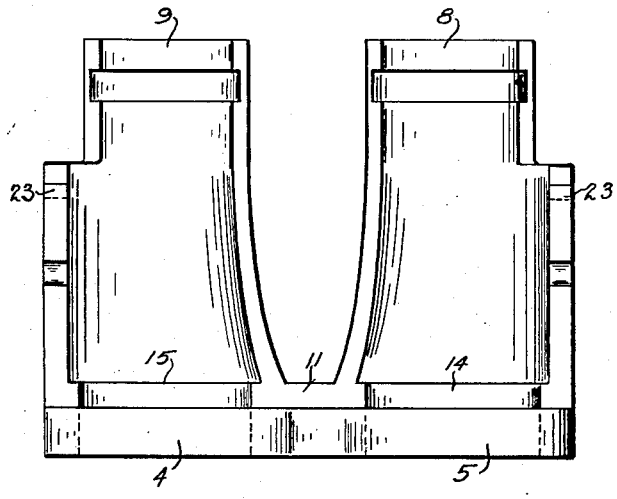
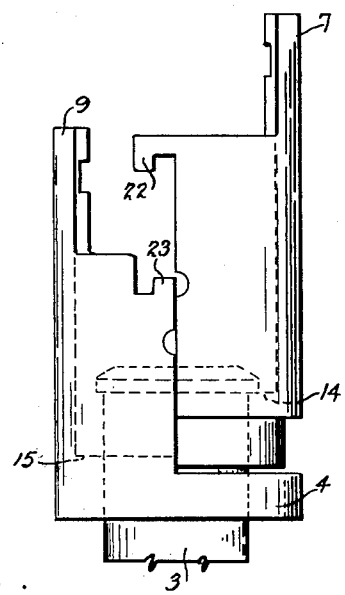
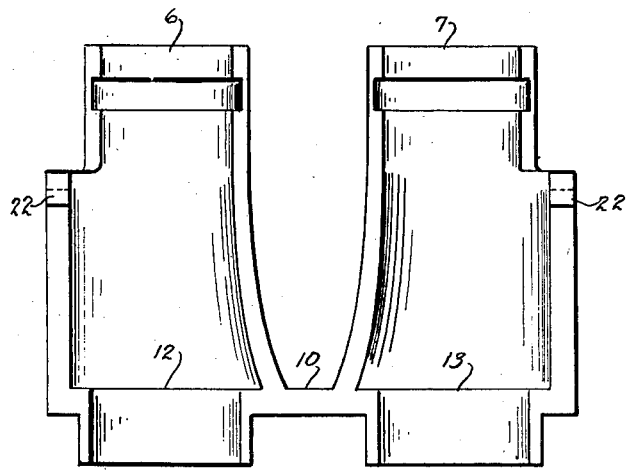

June 30, 1936.　　　F. C. FANTZ　　　2,046,156
RETURN BEND FOR OIL STILLS
Filed Feb. 24, 1933　　　7 Sheets-Sheet 5

INVENTOR
Fred C. Fantz
BY Harvey Lea Dodds
ATTORNEY

INVENTOR
Fred C. Fantz
BY Harry Lea Dodson
ATTORNEY

June 30, 1936.  F. C. FANTZ  2,046,156
RETURN BEND FOR OIL STILLS
Filed Feb. 24, 1933  7 Sheets-Sheet 7

INVENTOR
Fred C. Fantz
BY Harvey Lea Dodson
ATTORNEY

Patented June 30, 1936

2,046,156

UNITED STATES PATENT OFFICE 2,046,156

RETURN BEND FOR OIL STILLS

Fred C. Fantz, Webster Groves, Mo.

Application February 24, 1933, Serial No. 658,356

7 Claims. (Cl. 285—20)

My invention relates to that class of devices such as is shown in my United States Patent No. 1,843,125, which provides a housing for the return bend formed in two parts, hinged together.

The present invention has for its object to provide a construction in which the housing may be formed in two or more sections, which are detachable but not hinged together, in this instance, being provided with continuous annular members adapted to encircle the ends of a pair of tubes. These members have eccentric openings therethrough and shoulders formed on the half of the annular member adjacent the upwardly extending side walls, the eccentricity being provided in order that a shouldered arcuate portion formed on a mating section may be inserted in said opening and thus form a concentric shoulder which may abut a shoulder formed on the still tubes.

A further object of the invention is to provide means for locking the housing sections together so that it will be to all intents and purposes, the same as a one-piece housing when it is in place and the U bend has been removed for the purpose of gaining access to the tubes for cleaning purposes.

It is well known that, in the cracking of oil, carbon is frequently deposited in the interior of the tubes and that oil stills have to be shut down at periodic intervals of more or less duration for the purpose of removing this accumulation of coke, which is highly dangerous, due to the fact that it insulates the oil from the wall of the tube, and thus presents a possibility of the tube becoming heated beyond its ability to withstand the pressure in the interior of the tube and thus produce a rupture with attendant loss of property and possible life.

In order to remove this accumulation of coke in the interior of the tubes, it is necessary to gain access to their interior, therefore means have been provided for removing the return or U bend which provides a through passage to adjacent tubes. The constant tendency of the industry at this time is to provide more convenient means for this removal of the U bend and also means which will hold the ends of the tubes in position when the U bend is off, as it is well known that these tubes warp seriously during the refining operation, and unless the ends are held in alinement when the return bend is removed it is difficult, if not impossible, to secure a tight joint when the return or U bend is replaced, after the cleaning operation has been completed.

My means of accomplishing the foregoing objects may be more readily understood by having reference to the accompanying drawings, which are hereunto annexed and are a part of this specification, in which Fig. 1 is a side elevation of my improved construction, part of the housing being omitted, a portion of the exterior wall being broken away to show the interior and the means of mounting the tubes;

Fig. 5 shows a modified form of construction in side elevation, part of the housing being omitted, a portion of the exterior wall being broken away to show the interior and the means of mounting the tubes;

Fig. 6 is a cross section taken on the line 6—6 in Fig. 5, tubes and U bend being omitted;

Fig. 7 is a vertical sectional view taken on the line 7—7 in Fig. 5;

Fig. 8 is an end elevation showing the improved means for fastening the device together;

Figs. 9 and 10 are detailed views of my device as shown in Figs. 1 to 4 inclusive;

Fig. 11 is an end elevation of my device shown in Fig. 1 showing the method of assembly;

Figs. 12 and 13 are detailed views of my improved device as shown in Figs. 5 to 8 inclusive;

Fig. 14 is an end elevation of the same showing method of assembling my device;

Similar reference numerals refer to similar parts throughout the entire description.

Figure 1:
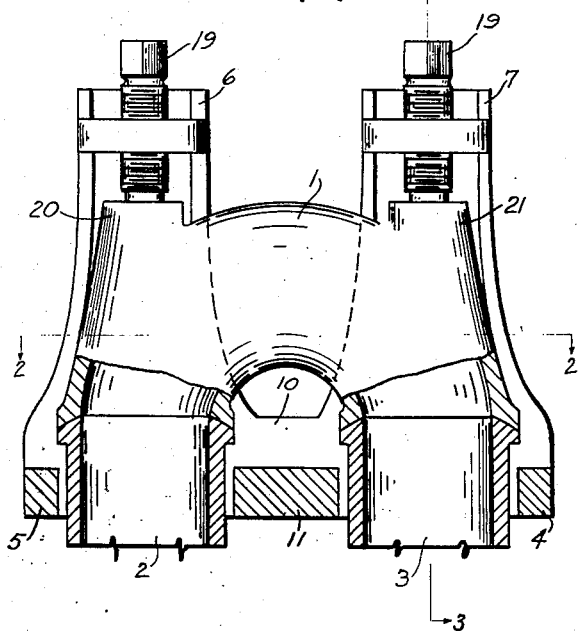
Figure 3:
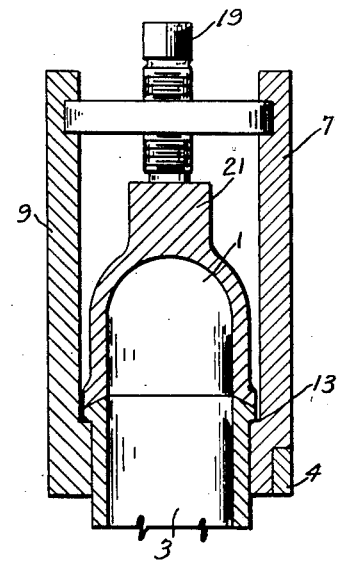
Fig. 3 is a vertical section on the line 3—3 in Fig. 2.
Figure 2:
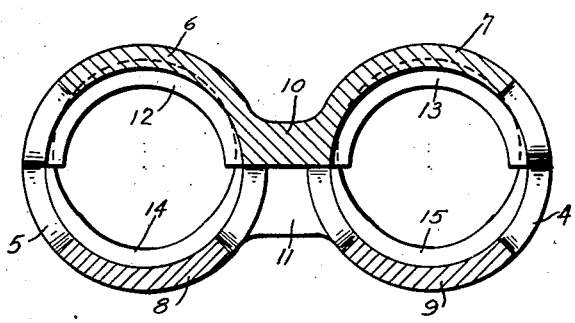
Fig. 2 is a cross section on the line 2—2 in Fig. 1, the U bend being omitted.
Figure 4:
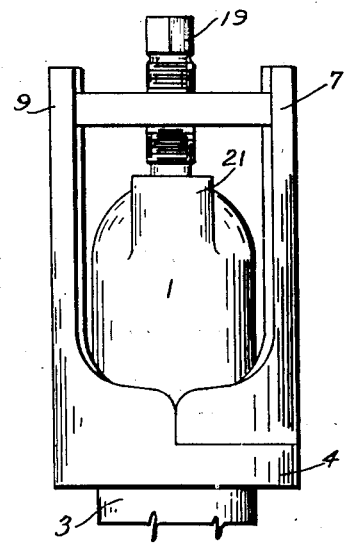
Fig. 4 is an end elevation.

As shown in Figs. 1 to 6, a conventional return or U bend 1 is provided to connect two tubes 2 and 3 so as to provide a continuous passageway therethrough. The return bend 1, is mounted in a housing which is formed in two halves, one of which is provided with annular members 4 and 5, which are adapted to encircle the ends of the tubes 2 and 3. These members have eccentric openings in them. The other half of the housing is formed of two upwardly extending side walls 6 and 7 which correspond to the upwardly extending side walls 8 and 9, cast or formed integral with the annular members 4 and 5. These side walls 6 and 7 are connected by means of a suitable web 10. As shown it is continuous although it will be apparent to persons skilled in the art that it may be formed separately and means provided for securing the two parts of the web together by any of the standard means employed for that purpose.

The annular members 4 and 5 are connected by a web 11, which serves to hold the ends of the tubes 2 and 3 in alinement when the U bend is removed for the purpose of gaining access to the interior of the tubes.

The side walls 6 and 7 are provided with downwardly extending arcuate portions, adapted to be inserted into the annular members 4 and 5. These arcuate portions have inwardly extending flanges 12 and 13, which are adapted to register with inwardly extending flanges 14 and 15 formed on the inner surface of the annular members on the sides thereof adjacent to the upwardly extending side walls 8 and 9. These shoulders extend for approximately 180 degrees around the annular members. When the downwardly depending arcuate portions are inserted into the annular members it will be apparent that these shoulders 12 and 14, and 13 and 15 form a continuous concentric shoulder against which is abutted the shoulders formed by upsetting the ends of the tubes 2 and 3.

Slots are formed in the upper end of the side walls adjacent to the ends thereof and detachable means are mounted therein. Set screws 19 are mounted in the detachable means. The inner ends of these set screws engage abutments 20 and 21 formed on the external surface of the return bend 1.

It will be apparent to persons skilled in the art that when this type of construction is employed, that by tightening the set screws 19 the return bend will be forced into a tight engagement with the ends of the tubes, thus forming a leak-proof joint.

In the modified construction shown in Figs. 5, 6, 7, 8, 12, 13, and 14, the outer sides of the walls 6, 7, 8, and 9 are extended around until they abut each other. Outwardly extending hooks 22 are formed on the side walls 6 and 7, which are engaged by registering hooks 23 formed on the side walls 8 and 9, when they abut the walls 6 and 7. It will be apparent that when these hooks are in engagement that the housing will be held from separation. At the same time it is possible that by drawing the U bend away from the end of the tubes it might be possible for the half of the housing, which is not connected to the annular members to be dislodged, and cause considerable annoyance. I overcome this objection by providing a detachable pin 24, which is mounted in a hole drilled into the two mating walls. Obviously when the pin 24 is inserted into this hole it is impossible to move the two halves so as to dislodge hooks 22 and 23, and they cannot be disengaged until the pin 24 is removed.

Figure 15:
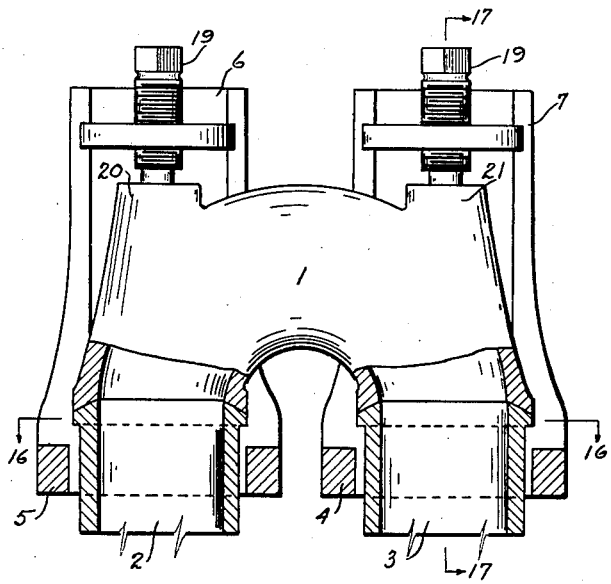
Fig. 15 is a view similar to Fig. 1 showing a modified form of construction for close nesting.
Figure 17:
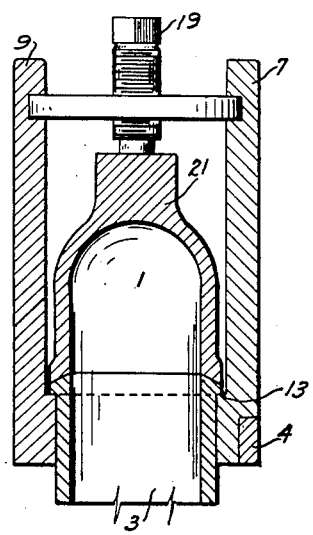
Fig. 17 is a vertical section on the line 17—17 of Fig. 15.
Figure 16:
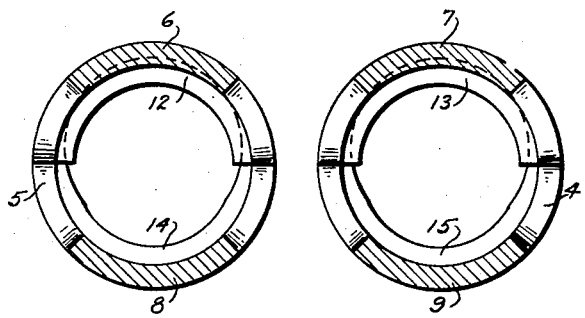
Fig. 16 is a cross section on the line 16—16 in Fig. 15.
Figure 18:
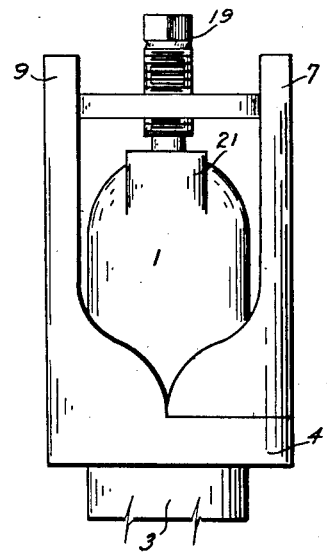
Fig. 18 is an end elevation of the device as shown in Fig. 15.
Figure 19:
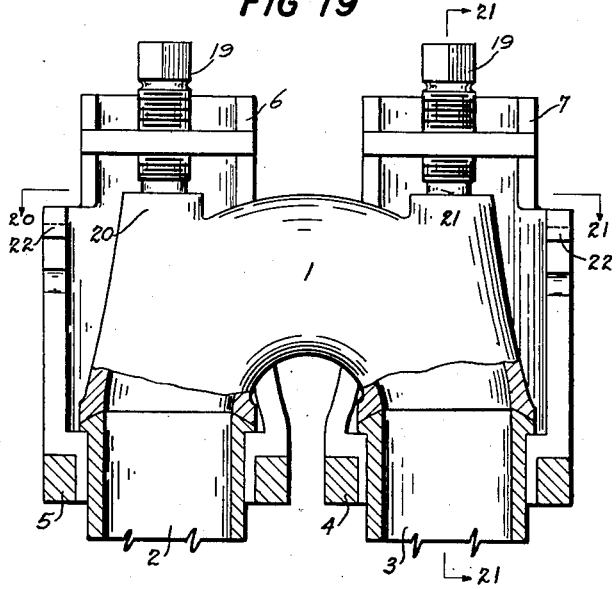
Fig. 19 is a side elevation showing a modified form of my device as shown in Fig. 15.
Figure 21:
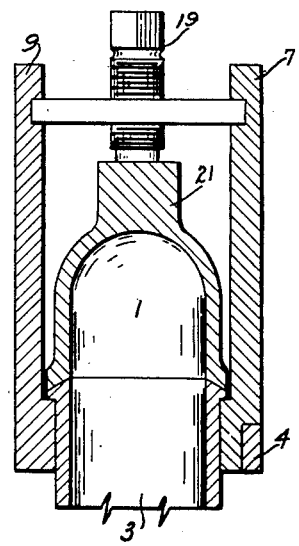
Fig. 21 is a vertical section on the line 21—21 of Fig. 19.
Figure 20:
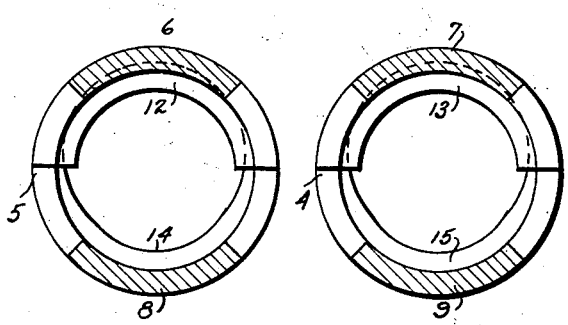
Fig. 20 is a cross section on the line 20—20 of Fig. 19.
Figure 22:
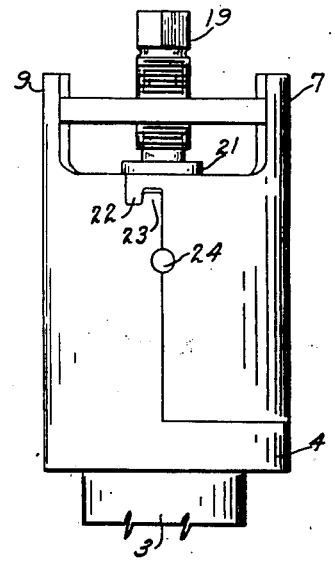
Fig. 22 is an end elevation of the device shown in Fig. 19.
Figure 23:
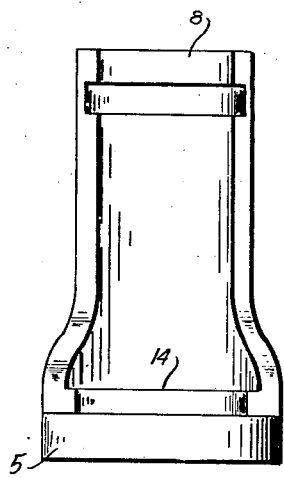
Figs. 23 and 24 are detailed views of the housing member shown in Fig. 15.
Figure 24:
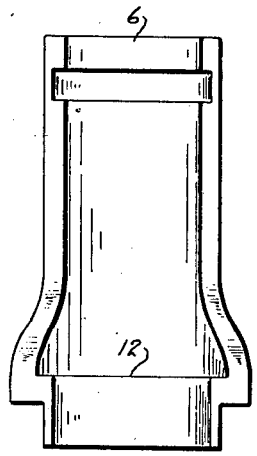
Figure 25:
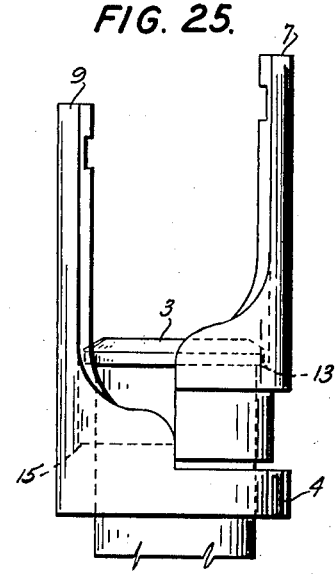
Fig. 25 shows the method of assembling these housing members.
Figure 26:
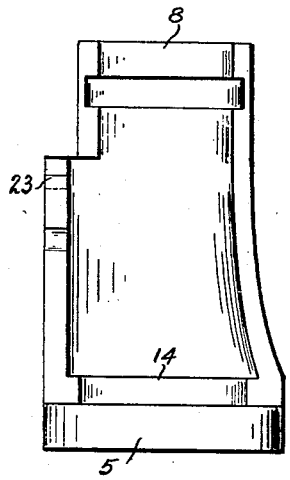
Figs. 26 and 27 are detailed views of the housing member shown in Figs. 19 to 22 inclusive.
Figure 27:
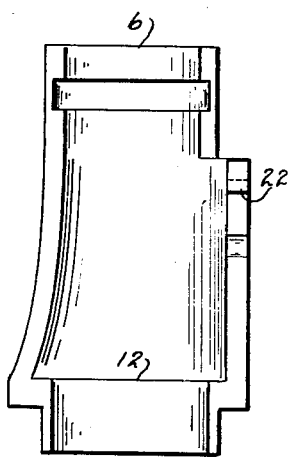
Figure 28:
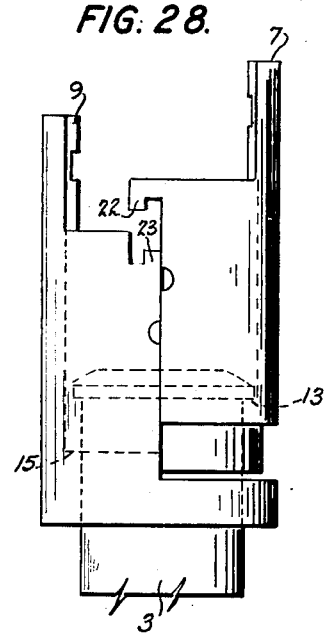
Fig. 28 shows the method of assembling this form of construction.

In the modified form of construction shown in Figs. 15, 16, 17, 18, 23, 24, and 25, I provide a form of construction in which the housing is formed in four separate pieces, two of which are provided with annular members and two of which are formed by upwardly extending side walls, having downwardly depending portions which are adapted to be inserted intermediate the tubes and the walls of the annular members. This construction may be found desirable in some cases where there is extremely close nesting of the tubes in the tube coil or bank. As will be apparent on inspection of the drawings, Figs. 19, 20, 21, 22, 26, 27, and 28, the construction is similar to that heretofore described for Figs. 5, 6, 7, 8, 12, 13, and 14, only that the webs 10 and 11 are omitted. It may, in some cases, be found desirable to provide means for locking the side walls together when this form of construction is employed. When this is necessary I prefer to use the form shown in Figs. 8, 14, 22, and 28.

It will be apparent from the foregoing description that I have in this manner effectually prevented the sections from being dislodged when the U bend is removed. It should also be understood that the openings in all of the annular members are eccentric and that the shoulder only extends approximately 180 degrees. It will be apparent from the drawings and obvious to persons skilled in the art that eccentric openings are required in order to permit the insertion of the arcuate portion of the mating section Having described my invention, what I regard as new and desire to secure by Letters Patent is:

1. In a refinery apparatus, the combination, with a conventional return bend adapted to connect a pair of still tubes, a compound housing comprising a pair of sections, one of which has annular portions adapted to encircle the ends of a pair of tubes, the other half having upwardly extending side walls corresponding to the side walls on the first mentioned half and having downwardly depending arcuate portions adapted to be inserted into said annular sections intermediate the tube and the annular member, detachable means mounted in said housing to draw the face of the bend and the ends of the tubes tightly together, means to lock the two halves of the housing securely together, and means to prevent the disengagement of said locking means.

2. In a refinery apparatus, a return bend adapted to connect the ends of a pair of still tubes to form a continuous passage therethrough, a pair of annular members adapted to encircle the ends of the pair of tubes, and be locked thereto, upwardly extending side walls on said annular members, a pair of separate corresponding side walls having arcuate downwardly depending portions adapted to be inserted in the annular members intermediate the tubes and the annular members, inwardly extending shoulders on said arcuate portions and said annular members, means detachably mounted in said side walls, set screws in said means, which when tightened engage said return bend and form a leak-proof joint, means to lock the side walls of each annular member securely together, and means to prevent the longitudinal movement of said locking means so as to prevent the disengagement thereof.

3. In a refinery apparatus, the combination, with a conventional return bend adapted to connect a pair of still tubes, a compound housing comprising a pair of sections, one of which has annular portions adapted to encircle the ends of a pair of tubes, the other half having upwardly extending side walls corresponding to the side walls on the first mentioned half and having downwardly depending arcuate portions adapted to be inserted into said annular sections intermediate the tube and the annular member, detachable means mounted in said housing to draw the face of the bend and the ends of the tubes tightly together, the outer sides of said upwardly extending walls being continued around the circle until they abut, interengaging hooks formed on the abutting edges.

4. In a refinery apparatus, the combination, with a conventional return bend adapted to connect a pair of still tubes, a compound housing comprising a pair of sections, one of which has annular portions adapted to encircle the ends of a pair of tubes, the other half having upwardly extending side walls corresponding to the side walls on the first mentioned half and having downwardly depending arcuate portions adapted to be inserted into said annular sections intermediate the tube and the annular member, detachable means mounted in said housing to draw the face of the bend and the ends of the tubes tightly together, the outer sides of said upwardly extending walls being continued around the circle until they abut, interengaging hooks formed on the abutting edges, detachable means to prevent the disengagement of said hooks.

5. In a refinery apparatus, a conventional return bend adapted to connect a pair of still tubes, a compound housing formed of sections, two of which have continuous annular portions adapted to encircle the ends of a pair of tubes, upwardly extending side walls on said annular portions, there being eccentric openings in said annular portions, shoulders on one-half of the inner wall of said annular portions, the other sections having upwardly extending side walls corresponding to the side walls on the first named sections and downwardly depending arcuate portions adapted to be inserted into the eccentric opening in said continuous annular portions, shoulders on said arcuate portions whereby when they are inserted in said annular portions a concentric shoulder is formed adapted to abut a shoulder on a tube, detachable means mounted in said upwardly extending walls to draw the face of the return bend and the ends of the tubes, together to form a leak proof joint.

6. In a refinery apparatus, a conventional return bend adapted to connect a pair of still tubes, a compound housing formed of sections, two of which have continuous annular portions adapted to encircle the ends of a pair of tubes, upwardly extending side walls on said annular portions, there being eccentric openings in said annular portions, shoulders on one-half of the inner wall of said annular portions, the other sections having upwardly extending side walls corresponding to the side walls on the first named sections and downwardly depending arcuate portions adapted to be inserted into the eccentric opening in said continuous annular portions, shoulders on said arcuate portions whereby when they are inserted in said annular portions a concentric shoulder is formed adapted to abut a shoulder on a tube, detachable means mounted in said upwardly extending walls to draw the face of the return bend and the ends of the tubes together to form a leak proof joint, means to lock the sections securely together, and means to prevent the disengagement of said locking means.

7. In a refinery apparatus, a conventional return bend adapted to connect a pair of still tubes, a compound housing formed of sections, two of which have continuous annular portions adapted to encircle the ends of a pair of tubes, upwardly extending side walls on said annular portions, there being eccentric openings in said annular portions, shoulders on one-half of the inner wall of said annular portions, the other sections having upwardly extending side walls corresponding to the side walls on the first named sections and downwardly depending arcuate portions adapted to be inserted into the eccentric opening in said continuous annular portions, shoulders on said arcuate portions whereby when they are inserted in said annular portions a concentric shoulder is formed adapted to abut a shoulder on a tube, detachable means mounted in said upwardly extending walls to draw the face of the return bend and the ends of the tubes together to form a leak proof joint, and means to lock the sections of the housings securely together.

FRED C. FANTZ.